(12) United States Patent
Sculto et al.

(10) Patent No.: US 11,359,529 B2
(45) Date of Patent: Jun. 14, 2022

(54) MONITORING OF DIESEL OXIDATION CATALYST IN AFTERTREATMENT ASSEMBLY

(71) Applicant: GM GLOBAL TECHNOLOGY OPERATIONS LLC, Detroit, MI (US)

(72) Inventors: Marco Sculto, Turin (IT); Claudio Ciaravino, Turin (IT); Luisa Cusanno, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 71 days.

(21) Appl. No.: 16/806,337

(22) Filed: Mar. 2, 2020

(65) Prior Publication Data

US 2021/0270160 A1 Sep. 2, 2021

(51) Int. Cl.
*F01N 3/00* (2006.01)
*F01N 3/023* (2006.01)
*F01N 11/00* (2006.01)
*F01N 3/10* (2006.01)
*B01D 53/94* (2006.01)

(52) U.S. Cl.
CPC ............ *F01N 3/023* (2013.01); *B01D 53/944* (2013.01); *B01D 53/9495* (2013.01); *F01N 3/103* (2013.01); *F01N 11/002* (2013.01); F01N 2900/1402 (2013.01); F01N 2900/1404 (2013.01); F01N 2900/1602 (2013.01)

(58) Field of Classification Search
CPC ........ F01N 3/023; F01N 11/002; F01N 3/103; F01N 2900/1402; F01N 2900/1602; F01N 2900/1404; B01D 53/944; B01D 53/9495
See application file for complete search history.

(56) References Cited

U.S. PATENT DOCUMENTS

| 5,675,967 A * | 10/1997 | Ries-Mueller ........ F01N 11/002 60/284 |
| 5,706,652 A * | 1/1998 | Sultan .................... F01N 11/002 60/274 |
| 6,408,616 B1 * | 6/2002 | Mazur .................... F01N 3/2066 60/277 |
| 9,909,482 B2 | 3/2018 | Ardanese et al. |

(Continued)

FOREIGN PATENT DOCUMENTS

JP          H0460106          *  2/1992  ............ F01N 11/002

*Primary Examiner* — Matthew T Largi
(74) *Attorney, Agent, or Firm* — Quinn IP Law

(57) ABSTRACT

A system and method for controlling an aftertreatment assembly includes a diesel oxidation catalyst (DOC) device configured to receive an exhaust gas. One or more sensors are configured to obtain respective sensor data relative to the exhaust gas and DOC device. A controller is in communication with the sensors and configured to obtain respective sensor data relative to the exhaust gas. The controller is configured to determine if one or more enabling conditions are met, including reaching a predefined temperature range in the DOC device. A rich event is induced targeting a predetermined range of a lambda value for a predefined maximum time duration. When the rich event has ended, an exotherm index is obtained for an observation window immediately after the rich event. The controller is configured to control operation of the aftertreatment assembly based at least partially on the exotherm index.

14 Claims, 2 Drawing Sheets

(56) References Cited

U.S. PATENT DOCUMENTS

| | | | |
|---|---|---|---|
| 10,337,377 B2 | 7/2019 | Latrofa et al. | |
| 2001/0033815 A1* | 10/2001 | Neuhausen | F01N 11/00 |
| | | | 423/213.2 |
| 2005/0103099 A1* | 5/2005 | van Nieuwstadt | F01N 9/005 |
| | | | 73/114.77 |
| 2006/0153761 A1* | 7/2006 | Bandl-Konrad | F01N 3/0842 |
| | | | 423/239.1 |
| 2008/0289318 A1* | 11/2008 | Elwart | F01N 3/0814 |
| | | | 60/274 |
| 2011/0056280 A1* | 3/2011 | Votsmeier | F01N 11/002 |
| | | | 73/114.75 |
| 2011/0099982 A1* | 5/2011 | Berke | F01N 9/00 |
| | | | 60/277 |
| 2011/0120091 A1* | 5/2011 | Leu | F02D 41/062 |
| | | | 60/274 |
| 2012/0036839 A1* | 2/2012 | Barasa | F01N 13/009 |
| | | | 60/286 |
| 2012/0060475 A1* | 3/2012 | Yacoub | F01N 3/208 |
| | | | 60/287 |
| 2017/0234197 A1* | 8/2017 | Dean | B01D 53/9495 |
| | | | 60/274 |
| 2019/0242311 A1* | 8/2019 | Lyon | F02D 41/401 |

\* cited by examiner

MONITORING OF DIESEL OXIDATION CATALYST IN AFTERTREATMENT ASSEMBLY

INTRODUCTION

The disclosure relates generally to control of operation of an aftertreatment assembly, and more particularly, to monitoring of a diesel oxidation catalyst device in an aftertreatment assembly. The combustion process in an internal combustion engine produces a number of by-products, such as hydrocarbons and carbon monoxide. Many vehicles employ aftertreatment devices to break down unwanted emissions in the exhaust gas emanating from the internal combustion engine. The efficiency of the aftertreatment devices may fluctuate over time.

SUMMARY

Disclosed herein is a system for controlling an aftertreatment assembly having a diesel oxidation catalyst device (referred to hereinafter as "DOC device") configured to receive an exhaust gas. One or more sensors are configured to obtain respective sensor data relative to the exhaust gas and the DOC device. A controller is in communication with the sensors, the controller having a processor and a tangible, non-transitory memory on which is recorded instructions. Execution of the instructions by the processor causes the controller to obtain the respective sensor data, including an outlet temperature of the exhaust gas exiting the DOC device. The controller is configured to determine if one or more enabling conditions are met, including reaching a predefined temperature range in the DOC device. A rich event is induced targeting a predetermined range of a lambda value for a predefined maximum time duration. When the rich event has ended, an exotherm index is obtained for an observation window immediately after the rich event. The controller is configured to control operation of the aftertreatment assembly based at least partially on the exotherm index.

Also disclosed herein is a method for controlling the aftertreatment assembly. The method includes obtaining the respective sensor data, via the one or more sensors, including an outlet temperature of the exhaust gas exiting the DOC device. The method includes determining if one or more enabling conditions are met, including a predefined temperature range in the DOC device, via the controller, and inducing a rich event targeting a predetermined range of a lambda value for a predefined maximum time duration. When the rich event has ended, the method includes determining an exotherm index based at least partially on the respective sensor data, via the controller. The exotherm index is determined for an observation window immediately after the rich event. The method includes controlling operation of the aftertreatment assembly based at least partially on the exotherm index, via the controller.

The exotherm index may be based at least partially on a difference between the outlet temperature and an inlet temperature of the exhaust gas exiting and entering the DOC device, respectively. The exotherm index may be based at least partially on a modeled heat release profile of the exhaust gas in the DOC device. When the rich event has ended, the controller is configured to determine if at least one aborting condition is met and abandon determination of the exotherm index if the least one aborting condition is met.

In one example, the predetermined range of the lambda value is between 0.95 and 0.98, inclusive. The enabling conditions may include the exhaust gas having a predefined minimum exhaust flow rate. The aftertreatment assembly may include a diesel particulate filter downstream of the DOC device. The rich event may be induced immediately after a regeneration cycle of the diesel particulate filter.

Controlling operation of the aftertreatment assembly may include comparing the exotherm index to a calibrated threshold index. A diagnostic signal is generated, via the controller, when the exotherm index falls below the calibrated threshold index. Controlling operation of the aftertreatment assembly may include commanding the engine to reduce production of the exhaust gas when the exotherm index falls below the calibrated threshold index. The calibrated threshold index may be selected to distinguish between respective data sets characterizing unacceptable devices and acceptable devices according to a predefined limit.

The above features and advantages and other features and advantages of the present disclosure are readily apparent from the following detailed description of the best modes for carrying out the disclosure when taken in connection with the accompanying drawings.

DETAILED DESCRIPTION

Figure 1:
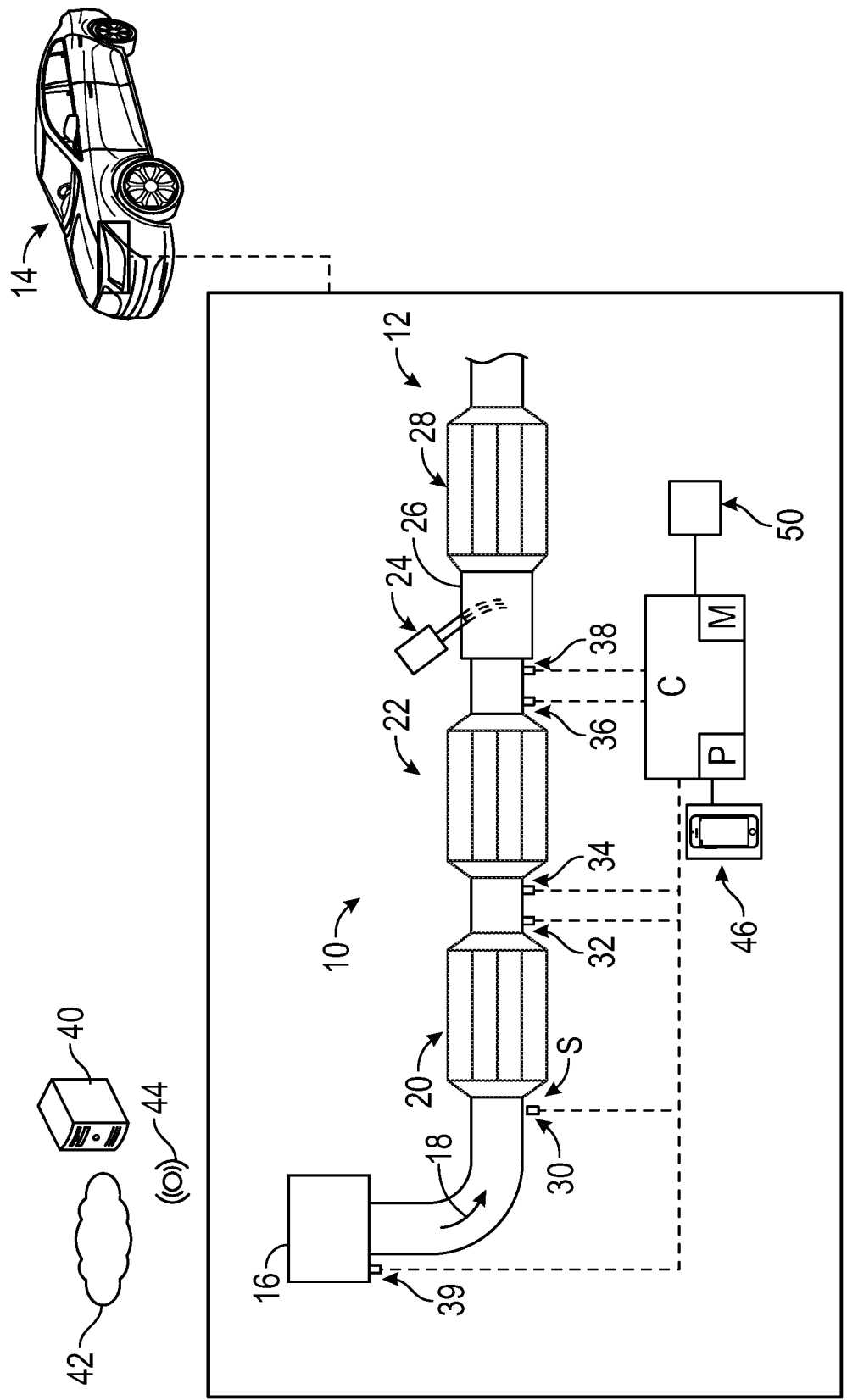
FIG. 1 is a schematic fragmentary view of an aftertreatment assembly having a diesel oxidation catalyst, a controller and/or mobile application.

Referring to the drawings, wherein like reference numbers refer to like components, FIG. 1 schematically illustrates a system 10 for tracking or monitoring one or more components of an aftertreatment assembly 12, which may be part of a device 14. The device 14 may be a mobile platform, such as, but not limited to, a passenger vehicle, sport utility vehicle, light truck, heavy duty vehicle, ATV, minivan, bus, transit vehicle, bicycle, moving robot, farm implement (e.g. tractor), sports-related equipment (e.g. golf cart), boat, airplane and train. It is to be understood that the device 14 may take many different forms and have additional components.

The device 14 includes an internal combustion engine 16, referred to herein as engine 16. The engine 16 is configured to combust an air-fuel mixture in order to generate output torque and may include a spark-ignition engine, a compression-ignition engine, a piston-driven engine or other type of engine available to those skilled in the art. Referring to FIG. 1, an exhaust gas 18 is expelled from the engine 16 to the aftertreatment assembly 12, produced largely by combustion of the air-fuel mixture.

Referring to FIG. 1, the aftertreatment assembly 12 includes a diesel oxidation catalyst device 20, referred to herein as DOC device 20, for breaking down components in the exhaust gas 18 from the engine 16. When passed over the DOC device 20, components such as carbon monoxide, gas phase hydrocarbons and the organic fraction of diesel particulates may be oxidized and controlled. For example, carbon monoxide and hydrocarbons are converted in the DOC device 20 to carbon dioxide and water vapor.

Referring to FIG. 1, the aftertreatment assembly 12 may include a particulate filter 22 configured to filter out particles or particulate matter produced by the engine 16. These particles may include soot, hydrocarbons, ashes and sulphuric acid. For example, the particulate filter 22 may include channels which are one-ended and have respective porous walls that the exhaust gas 18 travels through, leaving particles filtered on the respective porous walls. On regular intervals, the particulate filter 22 is thermally regenerated in order to remove the accumulated particles. The particulate filter 22 is configured to undergo thermal regeneration when the exhaust gas 18 is heated above a regeneration or combustion temperature, thereby allowing the particles to combust or burn. In one example, the regeneration temperature is between 600-740° C. Methods of performing regeneration may include, but are not limited to, using a fuel burner, using resistive heating coils and using microwave energy and other methods available to those skilled in the art.

Referring to FIG. 1, a reductant injector 24 may be configured to inject a reductant, such as urea, into the stream of exhaust gas 18. A mixer device 26 may be employed for providing a substantially even distribution. The aftertreatment assembly 12 may include a selective catalytic reduction device 28 having a catalyst. The selective catalytic reduction device 28 is configured to utilize constituents of the injected reductant to convert oxides of nitrogen (NOx) to other constituents, as understood by those skilled in the art.

Referring to FIG. 1, the system 10 includes a controller C having at least one processor P and at least one memory M (or non-transitory, tangible computer readable storage medium) on which instructions are recorded for executing a method 100, described below with respect to FIG. 2, for monitoring the DOC device 20. The memory M may store executable instruction sets, and the processor P may execute the instruction sets stored in the memory M.

The method 100 includes monitoring of conversion efficiency performance for the DOC device 20, detecting a partially working component and allowing the discrimination between parts meeting and parts exceeding specific predefined limits. An exotherm reaction is triggered and the method 100 obtains an exotherm index across the DOC device 20 which is used for assessing the status of the DOC device 20. It is challenging to highlight a gap between different levels of deterioration for a DOC device 20 that is partially working. A gap in terms of hydrocarbon conversion efficiency cannot be highlighted with a standard combustion strategy by simply injecting a large amount of hydrocarbons. The method 100 is configured to detect a DOC device 20 that is partially working even if warm; a partially working DOC device 20 may be performing as a fresh one once a light off condition is reached.

The controller C is specifically configured to execute the blocks of method 100 and may receive input from one or more sensors S configured to obtain respective sensor data, as shown in FIG. 1. The sensors S may include a first temperature sensor 30 and a second temperature sensor 32 configured to detect an inlet temperature and an outlet temperature, respectively, of the exhaust gas 18 entering and exiting the DOC device 20, respectively. The sensors S may include first and second pressure sensors 34, 36 and a third temperature sensor 38. The sensors S may include a wide-range AFR sensor 39 in communication with the controller C.

It should be noted that the temperature, pressure and other parameters related to the exhaust gas 18 may be quantified in other ways, including via "virtual sensing" and modeling based on other measurements and using sensors S at other locations. For example, as described below, a virtual temperature sensor modeling engine output, ambient temperature and conditions within the exhaust gas flow may be employed to estimate a heat release profile of the exhaust gas 18.

Referring to FIG. 1, the controller C may be configured to communicate with a remote server 40 and/or a cloud unit 42, via a wireless network 44, which may be a short-range network or a long-range network. The remote server 40 may be a private or public source of information maintained by an organization, such as for example, a research institute or a company. The cloud unit 42 may include one or more servers hosted on the Internet to store, manage, and process data.

The controller C may be configured to receive and transmit wireless communication to the remote server 40 through a mobile application 46, shown in FIG. 1. Referring to FIG. 1, the mobile application 46 may include a communications interface enabling vehicle-to-vehicle (V2V), vehicle-to-everything (V2X) and other types of communication, such as V2I, V2N, V2V, V2P, V2D and V2G. The mobile application 46 may be in communication with the controller C such that it has access to the data in the controller C. For example, the mobile application 46 may be embedded in a smart phone belonging to a user of the device 14 and plugged or otherwise linked to the device 14. The mobile application 46 may be physically connected (e.g. wired) to the controller C. Alternatively, the mobile application 46 may be embedded in the controller C. The circuitry and components of a mobile application 46 ("apps") available to those skilled in the art may be employed.

The wireless network 44 may be a Wireless Local Area Network (LAN) which links multiple devices using a wireless distribution method, a Wireless Metropolitan Area Networks (MAN) which connects several wireless LANs or a Wireless Wide Area Network (WAN) which covers large areas such as neighboring towns and cities. The wireless network 44 may be WIFI or a Bluetooth™ connection, defined as being a short-range radio technology (or wireless technology) aimed at simplifying communications among Internet devices and between devices and the Internet. Bluetooth™ is an open wireless technology standard for transmitting fixed and mobile electronic device data over short distances and creates personal networks, operating within the 2.4 GHz band. Other types of connections may be employed.

Figure 2:
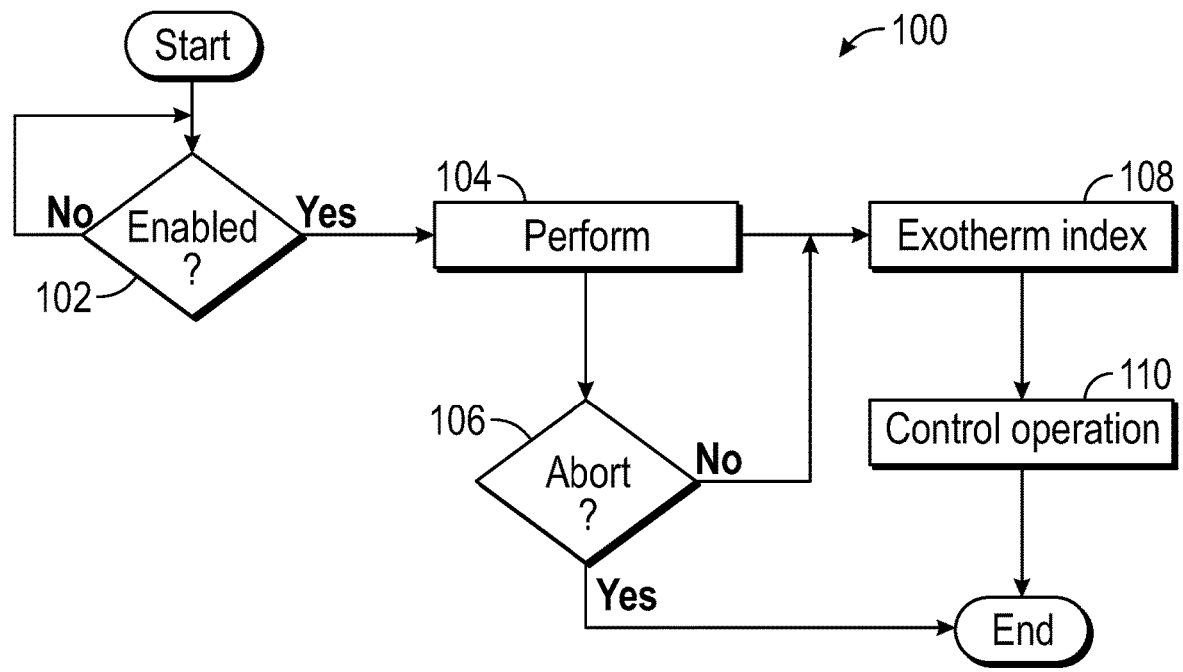
FIG. 2 is a flowchart for a method executable by the controller and/or mobile application of FIG. 1.

Referring now to FIG. 2, a flowchart of the method 100 is shown. Method 100 may be stored on and executable by at least one of the controller C and the mobile application 46 of FIG. 1. The method 100 need not be applied in the specific order recited herein and may be dynamically executed. Furthermore, it is to be understood that some steps may be eliminated. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Per block 102 of FIG. 2, the controller C is configured to obtain respective sensor data, via the sensors S, and determine if one or more enabling conditions are met. The enabling conditions include reaching a predefined temperature range in the DOC device 20 (which may be an average over time and space). The enabling conditions may include the exhaust gas 18 being having a predefined minimum exhaust flow rate.

If each of the enabling conditions are met, the method 100 proceeds to block 104. If not, the method is ended. Per block 104 of FIG. 2, the controller C is configured to induce or allow a rich combustion event, referred to herein as rich event. The rich event targets or achieves a predetermined range of a lambda value for a predefined maximum time duration. The lambda value (λ) may be calculated by the actual air-fuel ratio divided by the stoichiometric air-to-fuel ratio. The controller C may obtain an air-to-fuel ratio (AFR) based on input signals from the wide-range AFR sensor 39. In one example, the predetermined range of the lambda value is between 0.95 and 0.98, inclusive. The rich event may be attained by controlling the fuel and/or air components of combustion as understood by those skilled in the art.

Per block 106 of FIG. 2, the controller C is configured to determine if at least one aborting condition is met. The aborting condition may include the rich event maintaining the predefined temperature range and predefined minimum exhaust flow during the entire duration of the rich event. In one non-limiting example, the predefined temperature range for the rich event is set to be between 400 and 500° C., such as for example 440° C. In another example, the predefined minimum exhaust flow in the DOC device 20 during the rich event is set to be between 50 and 75 g/s, such as for example 60 g/s, and the minimum time duration time is set between 3 and 5 seconds. Efficiency parameter correction maps may be based on the average inlet temperature, mean exhaust flow in the DOC device 20 during the rich event and rich event quality indicators, including but not limited to, quantity of injected HC in the rich event and the actual time duration of the rich event.

Per block 108 of FIG. 2, an exotherm index is obtained based at least partially on the respective sensor data for an observation window immediately after the rich event. During steady state phases, the exotherm index is a function of the difference between the outlet temperature and the inlet temperature of the exhaust gas exiting and entering the DOC device 20, respectively.

Exotherm Index=(Outlet Temperature−Inlet Temperature)

Results may be corrected based on the inlet temperature of the DOC device 20. During transient phases, the exotherm index may be based at least partially on a modeled heat release profile of the exhaust gas 18 in the DOC device 20. A transient phase may be classified as when systemic changes do not permit a convergence in parameters (e.g. temperature, flow rate, pressure, etc.) characterizing the system, e.g. the inlet and outlet temperatures of the DOC device changing in a way that is unpredictable, observing just the temperatures profiles, impacted by other conditions such as overall operating temperatures, exhaust flow, humidity, system pressure, etc. An inert thermal model may be used to make the temperature changes predictable. The inert model would consider each input factor impacting the outlet temperature of the DOC device 20 to estimate the temperature profile of an inert DOC device 20 (component with no residual HC efficiency/CO conversion) in case of transient phases. The model may be calibrated on a real inert DOC device 20 to be robust. An inert DOC model available to those skilled in the art may be employed. By referring the measured outlet temperature of the DOC device 20 to the modeled one, it would be possible to take into account the conditions bringing changes in terms of the outlet temperature, compensating the effect of those which are not related to the heat release brought by the rich event. An exotherm index may be estimated based on the inert modeled heat release profile.

Per block 110 of FIG. 2, the method 100 includes controlling operation of the aftertreatment assembly 12, based in part on the exotherm index outputted from block 108. Controlling operation of the aftertreatment assembly 12 may include comparing the exotherm index to a calibrated threshold index and generating a diagnostic signal when the exotherm index falls below the calibrated threshold index. Controlling operation of the aftertreatment assembly 12 may include remedial actions on other sub-systems leveraging on the DOC device 20 for their working operations. For example, the controller C may command the engine 16 to reduce production of the exhaust gas 18 when the exotherm index falls below the calibrated threshold index, e.g. by shifting to a predefined operating mode with reduced speed.

The diagnostic signal may take several forms. For example, the diagnostic signal may include indicating a message on a display 50 (see FIG. 1) of the device 14, e.g., illuminating a "check engine" light on the display 50. The diagnostic signal may include a diagnostic report sent to a user, owner or fleet manager of the device 14 via the mobile application 46, to schedule a maintenance check or follow up. The alert may be sent to the remote server 40 via the wireless network 44 and/or the mobile application 46.

Figure 3:
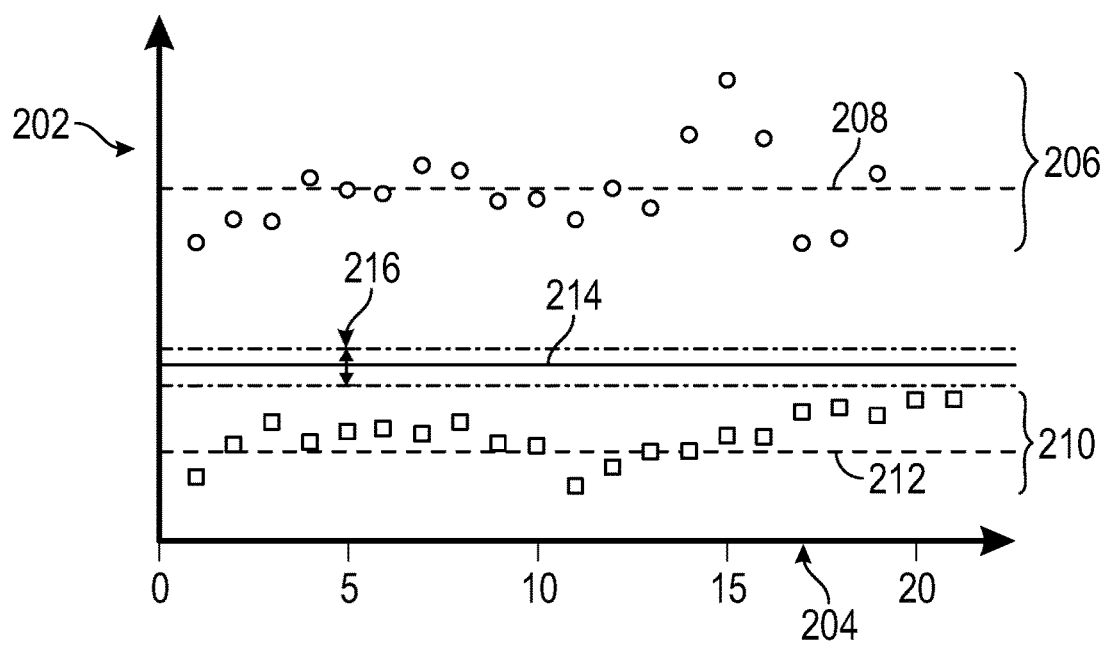
FIG. 3 is a schematic visualization of data obtained for a plurality of diesel oxidation catalyst devices in a calibration dataset.

The calibrated threshold index may be selected to distinguish between respective data sets characterizing unacceptable devices and acceptable devices according to a predefined limit. An example determination of the calibrated threshold index is described below. It is to be understood that other methods may be employed. Referring now to FIG. 3, is a schematic visualization of data obtained for a plurality of DOC devices in a calibration dataset is shown. The vertical axis 202 depicts the exotherm index and the horizontal axis 204 illustrates the number or sequence of the DOC test. Referring to FIG. 3, a first data set 206 (of DOC devices) shows an average exotherm index represented by first trace 208. The second data set 210 of DOC devices) shows an average exotherm index represented by second trace 212. A calibrated threshold index 214 having a standard deviation 216 may be extrapolated by highlighting a performance gap or difference between the unacceptable devices (highest exotherm index in the second data set 210) and acceptable devices (lowest exotherm index in the first data set 206) relative to a predefined limit or emission requirement.

In summary, monitoring and performance evaluation of the DOC device 20 may be performed by inducing a rich event. The maximum induced temperature difference or heat released may be measured through sensors S or simulated immediately after the rich event. The method 100 enables the highlighting or bringing out of a performance gap between the acceptable devices and unacceptable devices. A gap in conversion efficiency was not expected at relatively high temperature on components that are partially working. The method 100 provides an efficient way to monitor and control the aftertreatment assembly 12, thereby improving the functioning of the device 14.

The controller C may be an integral portion of, or a separate module operatively connected to, other controllers of the device 14. The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical and physical media with patterns of holes, a RAM, a PROM, an EPROM, a FLASH-EEPROM, other memory chips or cartridges, or other media from which a computer may read.

Look-up tables, databases, data repositories or other data stores described herein may include various kinds of mechanisms for storing, accessing, and retrieving various kinds of data, including a hierarchical database, a set of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating rechargeable energy storage system and may include files stored in various formats. An RDBMS may employ the Structured Query Language (SQL) in addition to a language for creating, storing, editing, and executing stored procedures, such as the PL/SQL language mentioned above.

The flowchart in FIG. 2 illustrate an architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based rechargeable energy storage systems that perform the specified functions or acts, or combinations of specific purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram blocks.

The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine. A parameter is defined as a measurable quantity that represents a physical property of a device or other element that is discernible using one or more sensors and/or a physical model. A parameter may have a discrete value, e.g., either "1" or "0", or may be infinitely variable in value.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling an aftertreatment assembly, the system comprising:
   a diesel oxidation catalyst (DOC) device configured to receive an exhaust gas;
   a diesel particulate filter downstream of the DOC device;
   one or more sensors configured to obtain respective sensor data relative to the exhaust gas;
   a controller in communication with the one or more sensors and having a processor and a tangible, non-transitory memory on which instructions are recorded, execution of the instructions by the processor causing the controller to:
   obtain the respective sensor data, via the one or more sensors, including an outlet temperature of the exhaust gas exiting the DOC device;
   determine if one or more enabling conditions are met, including reaching a predefined temperature range in the DOC device;
   induce a rich event targeting a predetermined range of a lambda value for a predefined maximum time duration, including controlling an air-to-fuel ratio;
   when the rich event has ended, determine an exotherm index based at least partially on the respective sensor data for an observation window immediately after the rich event;
   adjust the exotherm index in a transient phase, based in part on a modeled heat release profile of the DOC device obtained via an inert thermal model; and
   control operation of the aftertreatment assembly based at least partially on the exotherm index; and
   wherein the rich event is induced immediately after a regeneration cycle of the diesel particulate filter.

2. The system of claim 1, wherein:
   the exotherm index is based at least partially on a difference between the outlet temperature and an inlet temperature of the exhaust gas exiting and entering the DOC device, respectively.

3. The system of claim 1, wherein:
   the predetermined range of the lambda value is between 0.95 and 0.98, inclusive.

4. The system of claim 1, wherein:
   the one or more enabling conditions include the exhaust gas having a predefined minimum exhaust flow rate; and
   when the rich event has ended, the controller is configured to determine if at least one aborting condition is met and abandon determination of the exotherm index if the at least one aborting condition is met.

5. The system of claim 1, wherein controlling operation of the aftertreatment assembly includes:

comparing the exotherm index to a calibrated threshold index; and generating a diagnostic signal, via the controller, when the exotherm index falls below the calibrated threshold index.

6. The system of claim 5, further comprising:

an engine configured to produce the exhaust gas; and wherein controlling operation of the aftertreatment assembly includes commanding the engine to reduce production of the exhaust gas when the exotherm index falls below the calibrated threshold index.

7. The system of claim 5, wherein:

the calibrated threshold index is selected to distinguish between respective data sets characterizing unacceptable devices and acceptable devices relative to a predefined limit.

8. A method for controlling operation of an aftertreatment assembly having one or more sensors, a diesel oxidation catalyst (DOC) device configured to receive an exhaust gas, and a controller having a processor and a tangible, non-transitory memory, the method comprising:

positioning a diesel particulate filter downstream of the DOC device;

obtaining respective sensor data, via the one or more sensors, including an outlet temperature of the exhaust gas exiting the DOC device;

determining if one or more enabling conditions are met, including reaching a predefined temperature range in the DOC device, via the controller;

inducing a rich event targeting a predetermined range of a lambda value for a predefined maximum time duration, via the controller, including controlling an air-to-fuel ratio, the rich event being induced immediately after a regeneration cycle of the diesel particulate filter;

when the rich event has ended, determining an exotherm index based at least partially on the respective sensor data for an observation window immediately after the rich event, via the controller;

adjusting the exotherm index in a transient phase, based in part on a modeled heat release profile of the DOC device obtained via an inert thermal model; and controlling operation of the aftertreatment assembly based at least partially on the exotherm index, via the controller.

9. The method of claim 8, further comprising:

determining the exotherm index at least partially as a difference between the outlet temperature and an inlet temperature of the exhaust gas exiting and entering the DOC device, respectively.

10. The method of claim 8, further comprising:

selecting the predetermined range of the lambda value to be between 0.95 and 0.98, inclusive.

11. The method of claim 8, further comprising:

selecting the one or more enabling conditions to include the exhaust gas having a predefined minimum exhaust flow rate; and determining if at least one aborting condition is met when the rich event has ended and abandon the determining of the exotherm index if the least one aborting condition is met.

12. The method of claim 8, wherein controlling operation of the aftertreatment assembly includes:

comparing the exotherm index to a calibrated threshold index; and generating a diagnostic signal, via the controller, when the exotherm index falls below the calibrated threshold index.

13. The method of claim 12, including an engine operatively connected to the DOC device, and wherein controlling operation of the aftertreatment assembly includes:

commanding the engine to reduce production of the exhaust gas when the exotherm index falls below the calibrated threshold index.

14. The method of claim 12, further comprising:

selecting the calibrated threshold index to distinguish between respective data sets characterizing unacceptable devices and acceptable devices according to a predefined limit.

* * * * *